United States Patent
Nishizawa

(10) Patent No.: US 7,701,485 B2
(45) Date of Patent: Apr. 20, 2010

(54) HIGH RESOLUTION IMAGING APPARATUS WITH REDUCED DATA

(75) Inventor: Tsutomu Nishizawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 793 days.

(21) Appl. No.: 11/182,754

(22) Filed: Jul. 18, 2005

(65) Prior Publication Data
US 2006/0044408 A1    Mar. 2, 2006

(30) Foreign Application Priority Data
Aug. 31, 2004    (JP)    ................ 2004-25251

(51) Int. Cl.
*H04N 5/228*    (2006.01)
*H04N 5/222*    (2006.01)
*H04N 5/14*    (2006.01)

(52) U.S. Cl. ............... 348/208.13; 348/333.11; 348/699

(58) Field of Classification Search ............ 348/208.13, 348/208.4, 222.1, 352, 218.1, 262, 333.11, 348/699, 155
See application file for complete search history.

(56) References Cited

U.S. PATENT DOCUMENTS

| | | | |
|---|---|---|---|
| 6,198,505 B1 | 3/2001 | Turner et al. | |
| 6,269,175 B1 | 7/2001 | Hanna et al. | |
| 7,304,681 B2 * | 12/2007 | Larner et al. | 348/352 |
| 2001/0031004 A1 * | 10/2001 | Kim et al. | 375/240.16 |
| 2002/0030749 A1 | 3/2002 | Nakamura et al. | |

FOREIGN PATENT DOCUMENTS

| | | |
|---|---|---|
| JP | 9-23405 A | 1/1997 |
| JP | 9-163210 A | 6/1997 |
| JP | 2002-94862 A | 3/2002 |
| WO | WO 03/084207 A2 | 10/2003 |

\* cited by examiner

*Primary Examiner*—Jason Chan
*Assistant Examiner*—Joel Fosselman
(74) *Attorney, Agent, or Firm*—Oliff & Berridge, PLC

(57) ABSTRACT

An imaging apparatus is disclosed which can increase recording resolution while reducing data amount handled during compression processing. The imaging apparatus includes a first imaging unit capturing an image of a subject and outputting a frame in first resolution in first time intervals, a second imaging unit capturing the image of the subject and outputting a frame in second resolution higher than the first resolution in second time intervals longer than the first time intervals, a detecting unit detecting motion vectors between the adjacent frames outputted from the first imaging unit and outputting the motion vectors as vector distribution information in the first resolution, a converting unit converting the vector distribution the in the first resolution into vector distribution information in the second resolution, and a recording unit recording on a storage media the vector distribution information in the second resolution and the frames outputted from the second imaging unit.

5 Claims, 6 Drawing Sheets

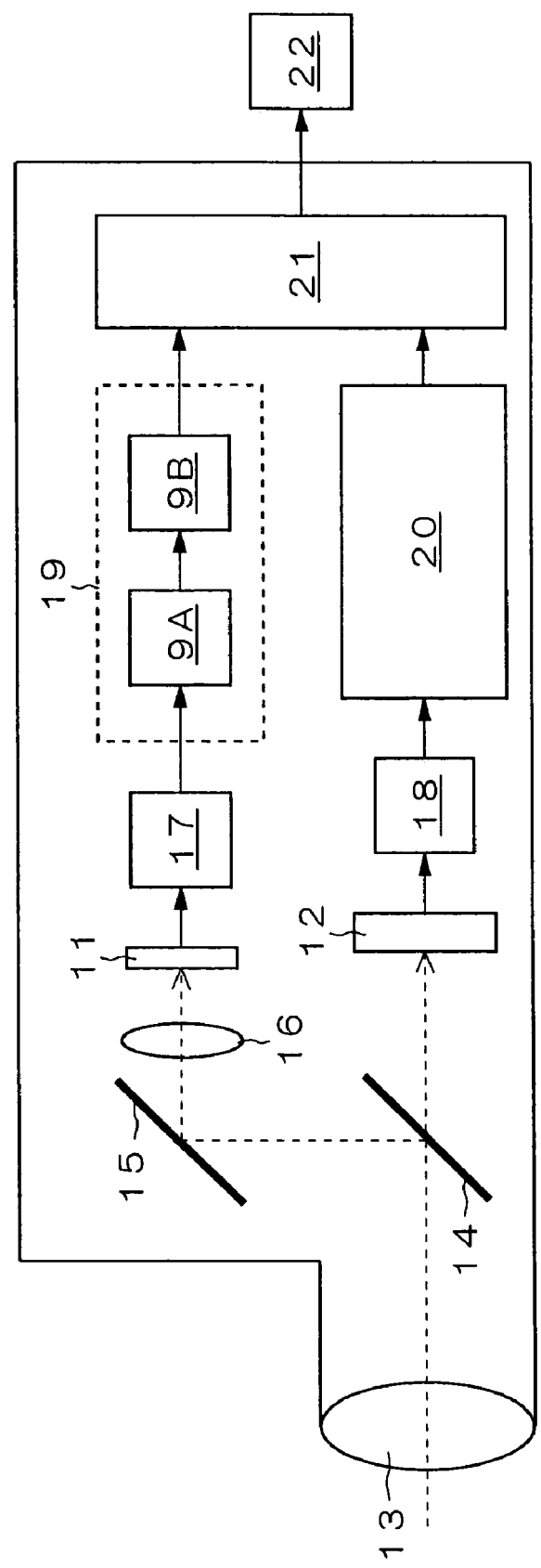

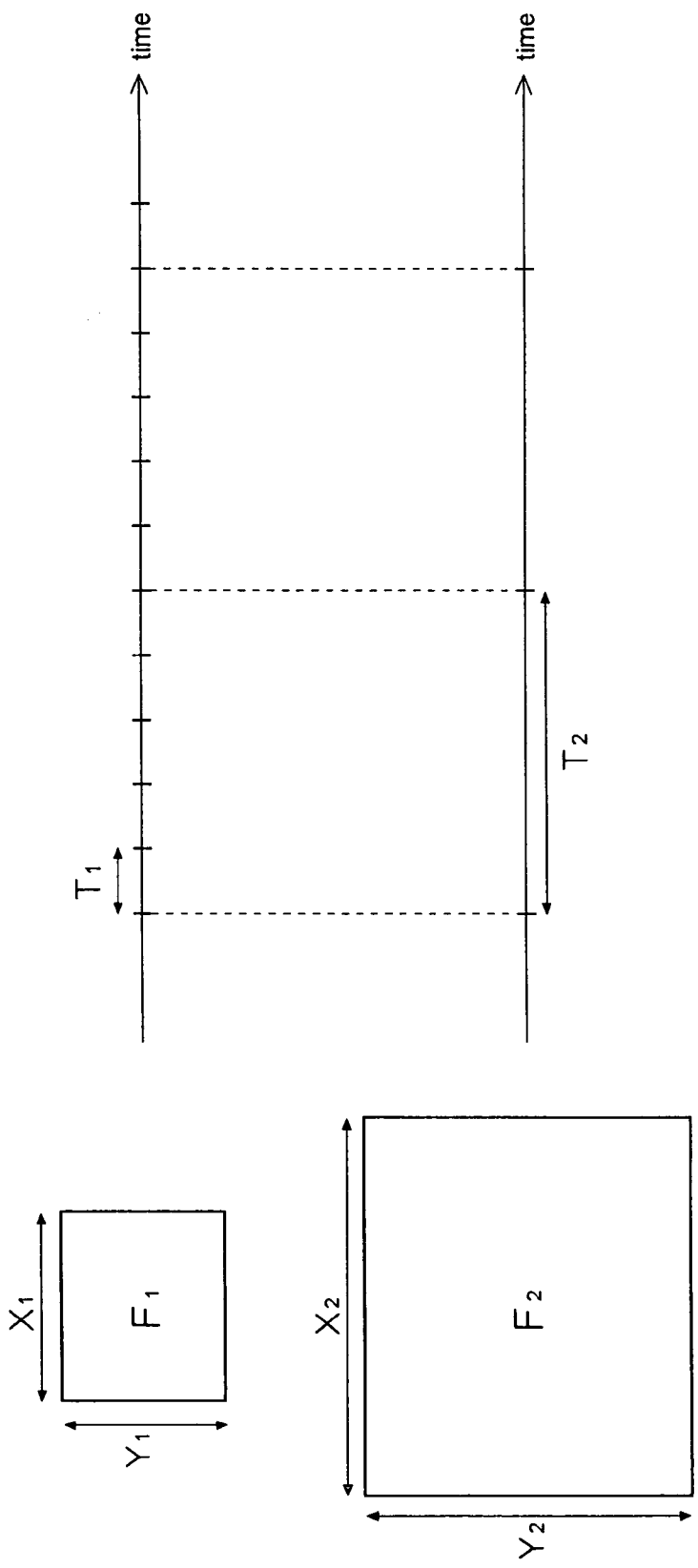

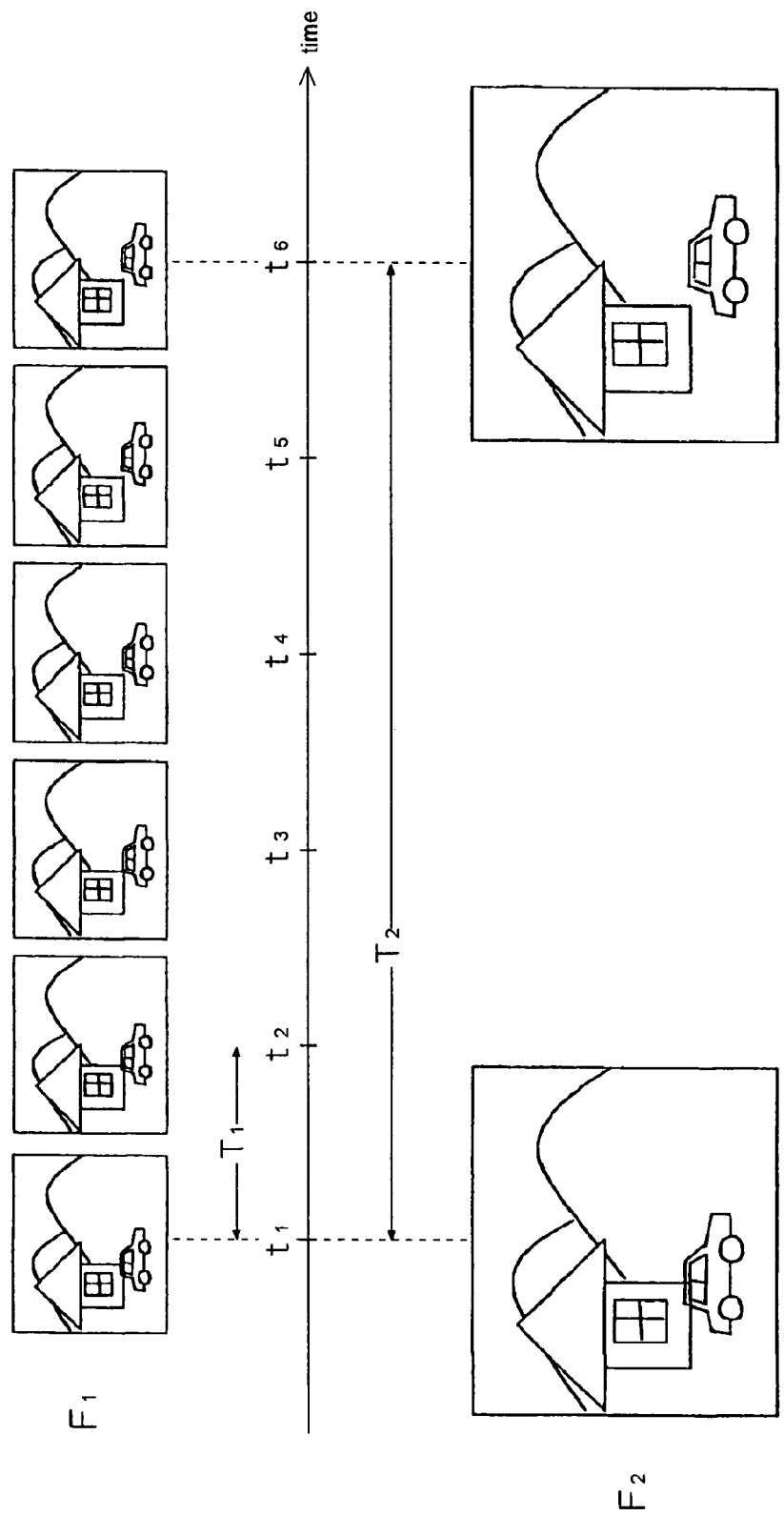

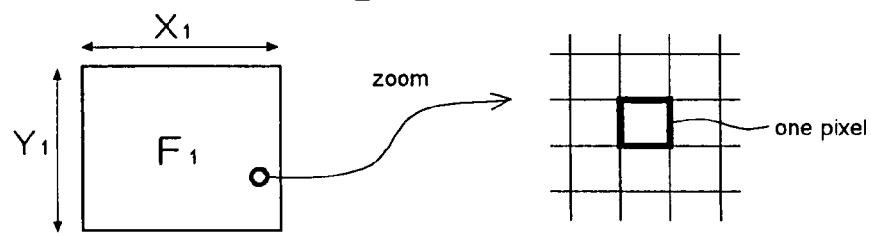
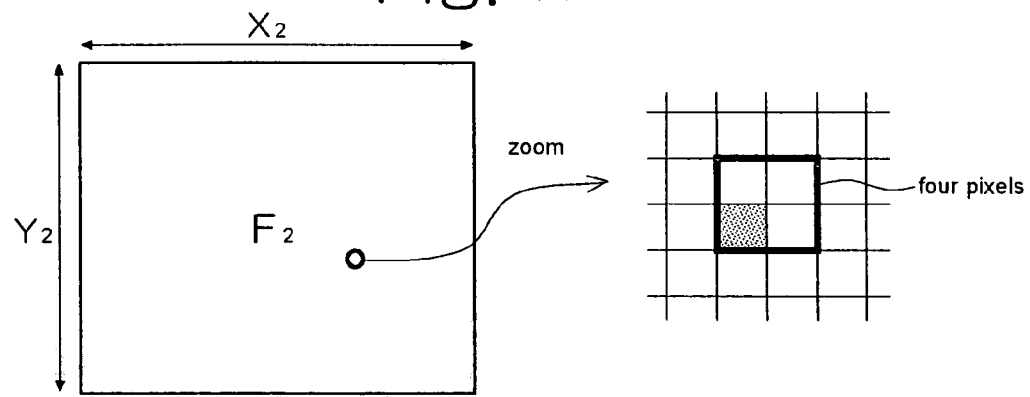
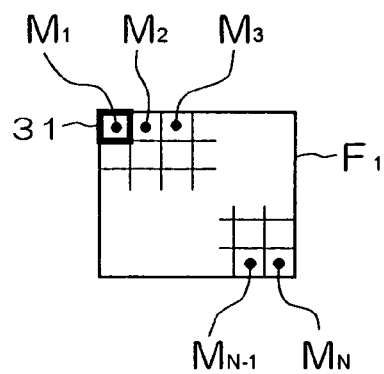

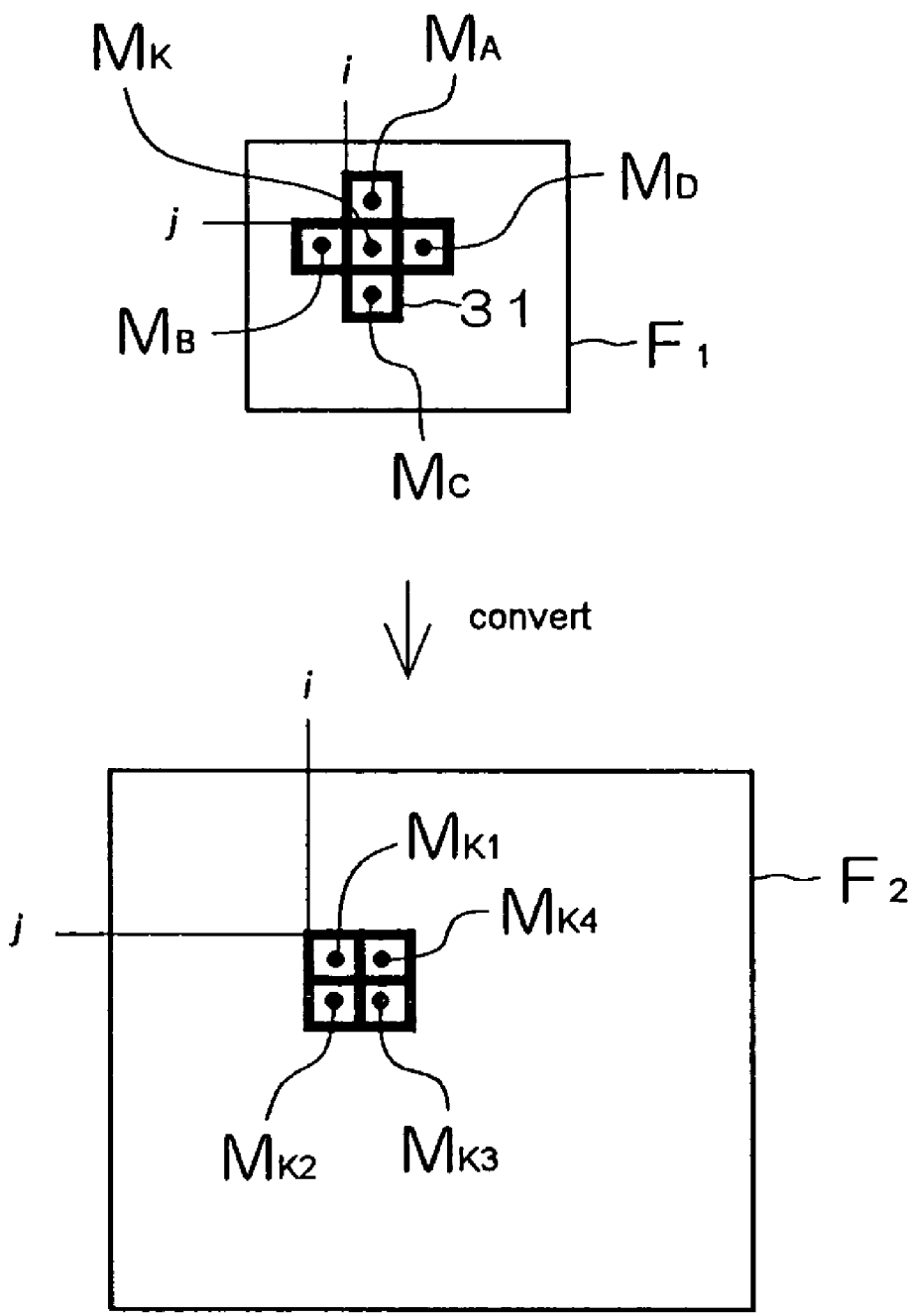

HIGH RESOLUTION IMAGING APPARATUS WITH REDUCED DATA

CROSS-REFERENCE TO RELATED APPLICATIONS

This application is based upon and claims the benefit of priority from Japanese Patent Application No. 2004-252451, filed on Aug. 31, 2004, the entire contents of which are incorporated herein by reference.

BACKGROUND OF THE INVENTION

1. Field of the Invention

The present invention relates to an imaging apparatus that shoots the moving image of a subject.

2. Description of the Related Art

The imaging apparatus which shoots the moving image compresses a plurality of frames which are sequentially outputted from an imaging device in various ways, in order to reduce the amount of data when recording. An internal circuit which performs compression processing takes in the frames in the same resolution in constant time intervals, and sequentially performs intra-frame compression processing and inter-frame compression processing (refer to Japanese Unexamined Patent Application Publication No. Hei 9-23405, for example).

However, the above-mentioned imaging apparatus performs the compression processing by taking in the frames with the same resolution. Therefore, when recording resolution is increased in order to obtain the moving image of high definition, the resolution of each frame increases, the amount of data to be handled during the compression processing increases, and processing speed lowers, which result in a slow imaging frame rate.

SUMMARY OF THE INVENTION

It is an object of the present invention to provide an imaging apparatus which can increase recording resolution while reducing the amount of data to be handled during compression processing.

The imaging apparatus according to the present invention includes a first imaging unit capturing an image of a subject and outputting a frame in a first resolution in first time intervals, a second imaging unit capturing the image of the subject and outputting a frame in second resolution which is higher than the first resolution in second time intervals that are longer than the first time intervals, a detecting unit detecting motion vectors between adjacent frames output from the first imaging unit and outputting the motion vectors as vector distribution information in the first resolution, a converting unit converting the vector distribution information in the first resolution into vector distribution information in the second resolution, and a recording unit recording on a storage media the vector distribution information in the second resolution and the frames output from the second imaging unit.

Further, it is preferable that the imaging apparatus according to the present invention further includes a generating unit generating a difference frame from a difference between a predictive frame predicted by motion compensation using the vector distribution information in the first resolution and the frame output from the first imaging unit. In this case, the converting unit further performs conversion processing of the difference frame in the first resolution which is generated by the generating unit into a difference frame in the second resolution, in addition to the conversion processing of the resolution of the vector distribution information. The recording unit further records the difference frame in the second resolution on the storage media, in addition to the vector distribution information in the second resolution and the frames output from the second imaging unit.

Furthermore, it is preferable that the detecting unit divides each frame output from the first imaging unit into a plurality of small blocks and detects the motion vector for each of the small blocks, and the converting unit performs the conversion processing by performing conversion processing for each of the small blocks in the vector distribution information in the first resolution, and when focusing on any one of the small blocks, performs said conversion processing by adding the motion vectors around the focused block to the motion vector of the focused block.

Moreover, it is preferable that the recording unit encodes and records the vector distribution information in the second resolution and the frames output from the second imaging unit by an MPEG system.

Further, it is preferable that the recording unit encodes and records the vector distribution information in the second resolution, the frames which are outputted from the second imaging unit, and the difference frame in the second resolution by an MPEG system.

Furthermore, it is preferable that the first imaging unit is also used as an AE and/or AF sensing unit, and the second imaging unit is also used as an imaging unit which photographs still images.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a block diagram showing internal configuration of a digital camera 10 according to this embodiment;

FIG. 2 is a schematic view explaining a difference in characteristics (continuous shooting speed and resolution) between imaging devices 1 and 12;

FIG. 3 is a schematic view showing frames $F_1$ and $F_2$ outputted from the imaging devices 11 and 12 in a time series order;

FIG. 4(A) is a schematic view explaining the correspondence of pixels in the frames $F_1$ and $F_2$ which are outputted from the imaging devices 11 and 12;

FIG. 4(B) is a schematic view explaining the correspondence of the pixels in the frames $F_1$ and $F_2$ which are outputted from the imaging devices 11 and 12;

FIG. 5 is a view explaining vector distribution information in low resolution;

FIG. 8 is a view explaining a modification example of the resolution conversion.

DESCRIPTION OF THE PREFERRED EMBODIMENTS

Figure 6:
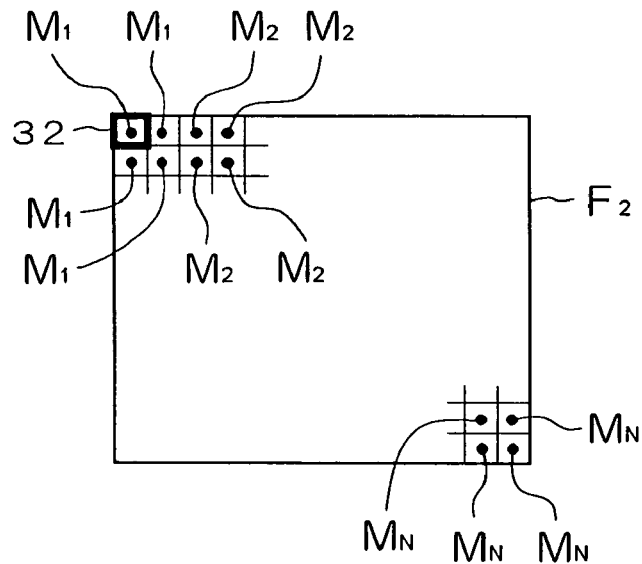
FIG. 6 is a view explaining vector distribution information in high resolution.

Hereinafter, a preferred embodiment of the present invention will be explained in detail with reference to the drawings.

An imaging apparatus 10 according to this embodiment is provided with two imaging devices 11 and 12, as shown in FIG. 1. The imaging devices 11 and 12 are CCD imaging devices, for example. Light from a subject falls inside the imaging apparatus 10 via a shooting lens 13 and subjected to optical path division in two directions via a half mirror 14. Thereafter, one transmitting light directly falls on the imaging device 12, and the other reflected light falls on the imaging device 11 via a mirror 15 and a correcting lens 16. The image of the subject is formed on each imaging surface of the imaging devices 11 and 12.

The correcting lens 16 is an optical system for correcting a difference in size between the imaging devices 11 and 12 and correcting a difference in optical path length from the shooting lens 13 to the imaging devices 11 and 12.

Now, differences in characteristics (continuous shooting speed and resolution) of the two imaging devices 11 and 12 will be explained with reference to FIG. 2.

The imaging device 11 is structured to have low resolution and be able to perform high-speed read out (30 frames per second, for example). Its number of effective pixels in the horizontal direction $X_1=640$, and the number of effective pixels in the vertical direction $Y_1=480$, for example. The imaging device 11 captures the image of the subject formed on its imaging surface, and repeatedly outputs a frame $F_1$ in low resolution corresponding to the numbers of effective pixels $X_1$ and $Y_1$ in time intervals of $T_1=1/30$ second. The time interval $T_1=1/30$ second satisfies the continuous shooting speed necessary for shooting moving image.

The imaging device 12 is structured to have high resolution and be able to perform low-speed read out (6 frames per second, for example). Its number of effective pixels in the horizontal direction $X_2=1280$, and the number of effective pixels in the vertical direction $Y_2=960$, for example. The imaging device 12 captures the image of the subject formed on its imaging surface, and repeatedly outputs a frame $F_2$ in high resolution corresponding to the numbers of effective pixels $X_2$ and $Y_2$ at time intervals of $T_2=1/6$ second. The time interval $T_2=1/6$ second is the speed lower than the continuous shooting speed necessary for shooting moving image.

According to this embodiment, one frame $F_2$ is outputted from the imaging device 12 in the high resolution every time the five frames $F_1$ are outputted from the imaging device 11 in the low resolution. Further, the frame $F_1$ in the low resolution is outputted simultaneously with the timing when the frame $F_2$ in the high resolution is outputted. Accordingly, the arrangement of the frames $F_1$ and $F_2$ outputted from the two imaging devices 111 and 12 in a time series order is as shown in FIG. 3. The frames $F_1$ and $F_2$ are outputted simultaneously at the time $t_1$, only the frame $F_1$ in the low resolution is outputted at the times $t_2$ to $t_5$, and the frames $F_1$ and $F_2$ are outputted simultaneously again at the time $t_6$. It should be noted that the same subject is reflected in the frames $F_1$ and $F_2$ which are outputted at the same time.

Further, according to this embodiment, the double number of effective pixels in the horizontal direction of the frame $F_1$ in the low resolution $X_1=640$ equals the number of effective pixels in the horizontal direction of the frame $F_2$ in the high resolution $X_2=1280$, and the double number of effective pixels in the vertical direction of the frame $F_1$ in the low resolution $Y_1=480$ equals the number of effective pixels in the vertical direction of the frame $F_2$ in the high resolution $Y_2=960$. Accordingly, as shown in FIGS. 4(A) and (B), one pixel in the frame $F_1$ in the low resolution (bold solid line frame in FIG. 4(A)) corresponds to four pixels in the frame $F_2$ in the high resolution (bold solid line frame in FIG. 4(B)). Incidentally, one pixel in the frame $F_2$ in the high resolution corresponds to a dot hatching area.

The imaging apparatus 10 of this embodiment is provided with A/D conversion parts 17 and 18, a data processing part 19, a compressing part 20 and a recording part 21 as shown in FIG. 1, in addition to the above two imaging devices 11 and 12 having different characteristics. Further, the data processing part 19 is constituted of a motion detecting part 9A and a resolution conversion part 9B. Furthermore, the imaging apparatus 10 is equipped with an external storage media 22 via the recording part 21. The external storage media 22 is a memory card or the like which is removable from the imaging apparatus 10.

The two kinds of the frames (that is, the frame $F_1$ in the low resolution and the frame $F_2$ in the high resolution) having the different resolution are taken from the imaging devices 11 and 12 into an internal circuit (17 to 21) of the imaging apparatus 10. The frames $F_1$ and $F_2$ from the imaging devices 11 and 12 are respectively converted from analog signals into digital signals via the A/D conversion parts 17 and 18, and outputted to the data processing part 19 and the compressing part 20. In the imaging apparatus 10, predetermined data processing is performed by the data processing part 19 and the compressing part 20 so as to reduce a data amount to be recorded on the external storage media 22.

The data processing in the compressing part 20 is intra-frame compression processing. The compressing part 20 takes in the frame $F_2$ in the high resolution in constant time intervals of $T_2=1/6$ second, performs the intra-frame compression processing, and then outputs it to the recording part 21 as data for 1 Picture (Intra-Picture) of an MPEG system (MPEG2 and the like, for example).

Meanwhile, the data processing in the data processing part 19 is inter-frame arithmetic processing. The data processing part 19 takes in the frame $F_1$ in the low resolution in constant time intervals of $T_1=1/30$ second, performs the inter-frame arithmetic processing, and then outputs motion vector information for generating data for P Picture (Predictive-Picture) or B Picture (Bidirectionally predictive-Picture) of the MPEG system to the recording part 21.

Concretely, in the motion detecting part 9A of the data processing part 19, each of the frames $F_1$ in the low resolution is divided into a plurality of small blocks 31, as shown in FIG. 5. Each small block 31 includes a plurality of pixels. Then, motion vectors $M_1, M_2, \ldots, M_N$ of the respective small blocks 31 are detected between adjacent frames (between the frame $F_1$ at the time $t_1$ and the frame $F_1$ at the time $t_2$ in FIG. 3, for example).

These motion vectors $M_1, M_2, \ldots, M_N$ are brought into correspondence with positional information of the small blocks 31 in the frame $F_1$ in the low resolution. After the motion detecting part 9A detects the motion vectors $M_1, M_2, \ldots, M_N$ of the respective small blocks 31, it outputs the motion vectors $M_1, M_2, \ldots, M_N$ to the resolution conversion part 9B as vector distribution information in the low resolution (FIG. 5). Such motion detecting processing is performed in constant time intervals of $T_1=1/30$ second.

The resolution conversion part 9B performs conversion processing of the vector distribution information in the low resolution (FIG. 5) which is inputted from the motion detecting part 9A into vector distribution information in the high resolution (FIG. 6). In the vector distribution information in the high resolution (FIG. 6), positional information of small blocks 32 in the frame $F_2$ in the high resolution is brought into correspondence with motion vectors $M_1, M_2, \ldots, M_N$ of the respective small blocks 32.

According to this embodiment, it is supposed that the small block 32 in the frame $F_2$ in the high resolution has the same number of pixels as the small block 31 in the frame $F_1$ in the low resolution. In this case, one small block 31 in the frame $F_1$ in the low resolution corresponds to the four small blocks 32 in the frame $F_2$ in the high resolution, similarly to the correspondence of the pixels as shown in FIGS. 4.

Figure 7:
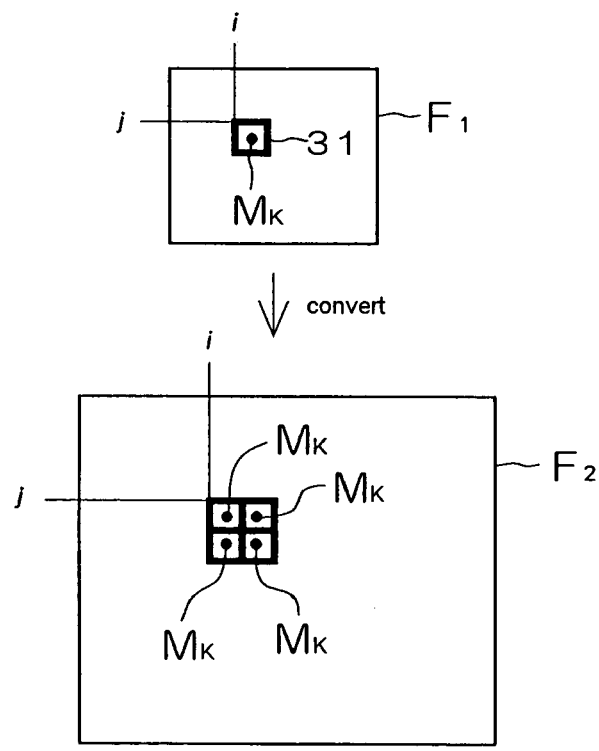
FIG. 7 is a view explaining resolution conversion.

The resolution conversion processing is performed for each of the small blocks 31 in the vector distribution information in the low resolution (FIG. 5). Focusing on a motion vector $M_K$ of the small block 31 at the position (i, j) in the frame $F_1$ in the low resolution as shown in FIG. 7, for example, the motion vector $M_K$ is applied to the four small blocks 32 at the same position (i, j) in the frame $F_2$ in the high resolution. Incidentally, in this case, the position coordinate in the frame $F_2$ in the high resolution represents the four small blocks (small blocks in the frame $F_1$ in the low resolution) consisting of two vertical and horizontal blocks as a unit. Namely, the motion vector $M_K$ which is the same as the small block 31 is assigned to the four small blocks 32.

The same conversion processing is performed for each of the motion vectors $M_1, M_2, \ldots, M_N$ of the vector distribution information in the low resolution (FIG. 5), so that the vector distribution information in the high resolution can be generated as shown in FIG. 6. After generating the vector distribution information in the high resolution (FIG. 6), the resolution conversion part 9B outputs it to the recording part 21. Such resolution conversion processing is also performed in constant time intervals of $T_1 = 1/30$ second.

The vector distribution information in the high resolution (FIG. 6) is inputted to the recording part 21 via the data processing part 19 (that is, the motion detecting part 9A and the resolution conversion part 9B) in constant time intervals of $T_1 = 1/30$ second, and the frame $F_2$ in the high resolution is inputted thereto via the compressing part 20 in constant time intervals of $T_2 = 1/6$ second. Then, the recording part 21 performs encoding by the MPEG system using the vector distribution information in the high resolution (FIG. 6) and the data of the frames $F_2$ in the high resolution, and records it on the external storage media 22.

According to the MPEG system, the compression processing is performed as follows by regarding GOP (Group of Pictures) consisting of the I Picture, P Picture and B Picture as one unit.

Incidentally, the I Picture is the frame which is subjected to intra-frame encoding without using preceding/succeeding prediction. When the subject to be shot is accompanied with a certain amount of movement, the so-called motion-compensated inter-frame prediction is performed, in which the prediction of the image in the next frame is made by shifting the image by the determined motion vectors in a motion area of the image. According to the P Picture, a prediction image is generated using the past image and the determined motion vectors. According to the B Picture, the prediction image is generated using the temporally preceding/succeeding images and the determined motion vectors.

According to this embodiment, the image data corresponding to the I Picture can be obtained by the imaging device 12. Further, the motion vectors can be determined from the image data by the imaging device 11. The image data with the high resolution which is obtained by the imaging device 12 is subjected to the motion-compensated inter-frame prediction using thus-obtained motion vectors, so that the images corresponding to the P Picture and the B Picture can be obtained. Namely, it is possible to reproduce the image corresponding to the I Picture and the images corresponding to the P Picture and the B Picture once the image compression data in the high resolution obtained by the imaging device 12 and the motion vectors determined from the image data by the imaging device 11 are recorded.

As described thus far, according to the imaging apparatus 10 of this embodiment, the two kinds of the frames (that is, the frame $F_1$ in the low resolution and the frame $F_2$ in the high resolution) having the different resolution are taken in from the imaging devices 11 and 12, the predetermined intra-frame compression processing and inter-frame compression processing are performed by the data processing part 19 and the compressing part 20, and the vector distribution information in the high resolution (FIG. 6) and the frames $F_2$ are recorded, so that a moving image of high definition can be obtained.

Moreover, according to the imaging apparatus 10 of this embodiment, among the data handled during the compression processing, the frames $F_2$ outputted from the imaging device 12 in constant time intervals of $T_2 = 1/6$ second are the only data with the recording resolution, and the frames $F_1$ in the low resolution which have the smaller data amount are used to detect the motion vectors $M_1, M_2, \ldots, M_N$. Therefore, it is possible to increase the recording resolution while reducing the data amount to be handled during the compression processing.

Further, according to the imaging apparatus 10 of this embodiment, it is possible to cut out and use the frame $F_2$ in the high resolution which is outputted from the imaging device 12 as it is as a still image (continuous shooting image) of the high definition.

Furthermore, according to the imaging apparatus 10 of this embodiment, it is possible to use the imaging device 11 also as an AE and/or AF sensor (sensing unit), and to use the imaging device 12 also as an imaging device for shooting the still images. In this case, the usage of this imaging apparatus 10 of this embodiment can be arbitrarily switched between the usage as a digital still camera (shooting of the still image of the high definition) and the usage as a digital video camera (shooting of the moving image of the high definition).

Further, according to the imaging apparatus 10 of this embodiment, it is possible to arbitrarily switch between the moving image shooting only by the imaging device 11 (moving image shooting with suppressed power consumption and file size in shooting) and the moving image shooting of the high definition according to the above-described invention, so that the moving image shooting fitted to shooting purposes and situations is made possible.

MODIFICATION EXAMPLE

Incidentally, according to the above-described embodiment, the example of detecting the motion vectors $M_1, M_2, \ldots, M_N$ in the inter-frame compression by the data processing part 19 is explained. However, the present invention is not limited to the above. The present invention may be applied to the case where a predictive frame after the motion compensation using the vector distribution information in the low resolution (FIG. 5) is generated and a difference frame between the predictive frame and the frame $F_1$ in the low resolution which is outputted from the imaging device 11 is generated, as necessary.

In this case, in the resolution conversion part 9B, the conversion processing of the above-described difference frame in the low resolution into a difference frame in the high resolution is also performed, in addition to the resolution conversion processing of the vector distribution information (FIG. 5→FIG. 6). This conversion processing can also be performed similarly to FIG. 7. Namely, a density value of each small block 31 in the difference frame in the low resolution may be assigned as the density values of four small blocks 32 at the corresponding position in the difference frame in the high resolution.

Further, in the recording part 21, the difference frame in the high resolution which is inputted from the data processing part 19 together with the vector distribution information (FIG. 6) in constant time intervals of $T_1=\frac{1}{30}$ second is also encoded by the MPEG system and recorded on the external storage media 22, in addition to the vector distribution information in the high resolution (FIG. 6) which is inputted from the data processing part 19 in constant time intervals of $T_1=\frac{1}{30}$ second, and the frame $F_2$ in the high resolution which is inputted from the compressing part 20 in constant time intervals of $T_2=\frac{1}{6}$ second.

Moreover, according to the above-described embodiment, the example of assigning the motion vector $M_K$ of each small block 31 in the frame $F_1$ in the low resolution as the motion vectors $M_K$ of the four small blocks 32 at the corresponding position in the frame $F_2$ in the high resolution in the resolution conversion processing (refer to FIG. 7) is explained.

However, the present invention is not limited to the above. Focusing on any one of the small blocks 31 in the frame $F_1$ in the low resolution, as shown in FIG. 8, it is possible to perform the resolution conversion processing by adding (weighting and adding, for example) the motion vectors around the focused block ($M_A$, $M_B$, $M_C$ and $M_D$, for example) to the motion vector $M_K$ of the focused block, and to assign different (or the same) motion vectors $M_{K1}$, $M_{K2}$, $M_{K3}$ and $M_{K4}$ to the four small blocks 32. Such processing can further improve the image quality of the moving image of the high definition.

Furthermore, according to the above-described embodiment, the example of outputting the frame $F_1$ in the low resolution from the imaging device 11 simultaneously with the times $t_1$, $t_6$, ... (refer to FIG. 2 and FIG. 3) when the frame $F_2$ in the high resolution is outputted from the imaging device 12 is explained. However, the present invention is not limited to the above. The present invention may be applied to the case where the imaging timings of the imaging devices 11 and 12 are shifted. In this case, when the imaging timings of the both are known, the same effects can be obtained by adding these to the arithmetic of the compression processing.

Further, in the above-described embodiment, the example of arranging the correcting lens 16 between the imaging device 11 and the mirror 15 is explained. However, the present invention is not limited to the above. The position of the correcting lens 16 may be between the half mirror 14 and the mirror 15.

Moreover, according to the above-described embodiment, the example of bending the optical path from the shooting lens 13 to the imaging device 11 by the mirror 15 is explained. However, the mirror 15 may be omitted. In this case, the similar correcting lens and the imaging device 11 may be arranged on a reflecting optical path of the half mirror 14.

The invention is not limited to the above embodiments and various modifications may be made without departing from the spirit and scope of the invention. Any improvement may be made in part or all of the components.

What is claimed is:

1. An imaging apparatus comprising:
a first imaging unit that captures images of a subject and outputs frames each having a first resolution in first time intervals;
a second imaging unit that captures images of said subject and outputs frames each having a second resolution which is higher than said first resolution in second time intervals that are longer than said first time intervals;
a detecting unit that detects a plurality of motion vectors between adjacent frames that are outputted from said first imaging unit and outputs the plurality of motion vectors as vector distribution information in said first resolution;
a converting unit that converts the vector distribution information in said first resolution into vector distribution information in said second resolution; and
a recording unit that records on a storage media the vector distribution information in said second resolution and the frames that are outputted from said second imaging unit, wherein:
said detecting unit divides each of the frames output from said first imaging unit into a plurality of small blocks, each of said small blocks includes a plurality of pixels, and detects a motion vector for each of the small blocks as said motion vectors; and
said converting unit performs said conversion processing by performing conversion processing for each of the small blocks in the vector distribution information in said first resolution, and when focusing on any one of the small blocks, performs said conversion processing by adding motion vectors of neighboring blocks around the focused block to the motion vector of the focused block.

2. The imaging apparatus according to claim 1, further comprising:
a generating unit that generates a difference frame, having said first resolution, from a difference between a predictive frame predicted by motion compensation using the vector distribution information in said first resolution and the frame having said first resolution output from said first imaging unit, wherein:
said converting unit further performs conversion processing of said difference frame having said first resolution which is generated by said generating unit into a difference frame having said second resolution, in addition to the conversion processing of the resolution of said vector distribution information; and
said recording unit further records the difference frame having said second resolution on said storage media, in addition to the vector distribution information in said second resolution and the frames output from said second imaging unit.

3. The imaging apparatus according to claim 1, wherein:
said recording unit encodes and records the vector distribution information in said second resolution and the frames output from said second imaging unit by an MPEG system.

4. The imaging apparatus according to claim 1, wherein:
said first imaging unit is also used as at least one of an AE and an AF sensing unit; and
said second imaging unit is also used as an imaging unit which photographs still images.

5. The imaging apparatus according to claim 2, wherein:
said recording unit encodes and records the vector distribution information in said second resolution, the frames output from said second imaging unit, and the difference frame having said second resolution by an MPEG system.

* * * * *

UNITED STATES PATENT AND TRADEMARK OFFICE
CERTIFICATE OF CORRECTION

| | | |
|---|---|---|
| PATENT NO. | : 7,701,485 B2 | Page 1 of 1 |
| APPLICATION NO. | : 11/182754 | |
| DATED | : April 20, 2010 | |
| INVENTOR(S) | : Tsutomu Nishizawa | |

It is certified that error appears in the above-identified patent and that said Letters Patent is hereby corrected as shown below:

Title Page Please replace the following section as follows:

(30)   Foreign Application Priority Data

August 31, 2004     (JP)     ~~2004-25251~~ 2004-252451

Signed and Sealed this

Seventeenth Day of August, 2010

David J. Kappos
*Director of the United States Patent and Trademark Office*